United States Patent [19]

Searles

[11] 4,395,019

[45] Jul. 26, 1983

[54] SEAL FOR WEAR RESISTANT INSERTS

[75] Inventor: Raymond C. Searles, Russell, Ky.

[73] Assignee: Mobil Oil Corporation, New York, N.Y.

[21] Appl. No.: 257,049

[22] Filed: Apr. 24, 1981

[51] Int. Cl.³ .............................................. F16K 3/02
[52] U.S. Cl. ............................. 251/357; 137/625.31; 137/329.01
[58] Field of Search ...................... 137/625.31, 329.04; 137/329.03, 329.02, 329.01; 251/357, 208, 360

[56] References Cited

U.S. PATENT DOCUMENTS

| 663,607 | 12/1900 | Lynch | 251/357 |
| 890,997 | 6/1908 | Murray | 137/329.04 |

FOREIGN PATENT DOCUMENTS 1030766  5/1966  United Kingdom ................ 251/208

Primary Examiner—Arnold Rosenthal
Attorney, Agent, or Firm—Charles A. Huggett; Michael G. Gilman; Stanislaus Aksman

[57] ABSTRACT

In a pressure let-down valve comprising a fixed choke and a variable choke means, a silver solder joint between the wear-resistant insert and the retaining ring is replaced by a mechanical joint. The mechanical joint is comprised of a split-locking ring, preferably consisting of two separate segments, fitting into an annular outwardly opening channel in the wear-resistant insert. The split-locking ring is fastened to the retaining ring to lock the wear resistant insert into place.

13 Claims, 7 Drawing Figures

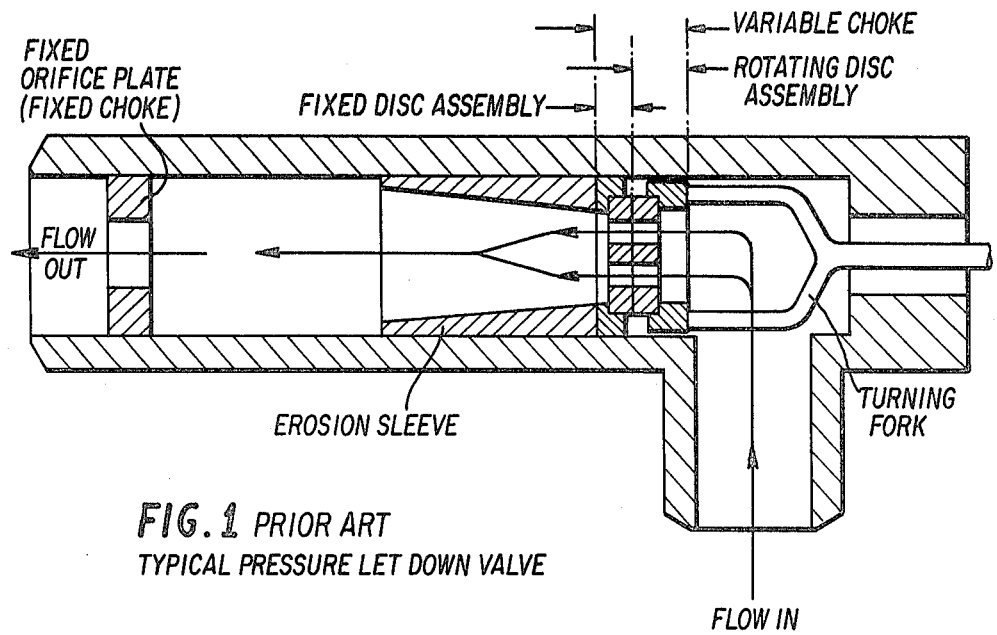
FIG. 1 PRIOR ART
TYPICAL PRESSURE LET DOWN VALVE
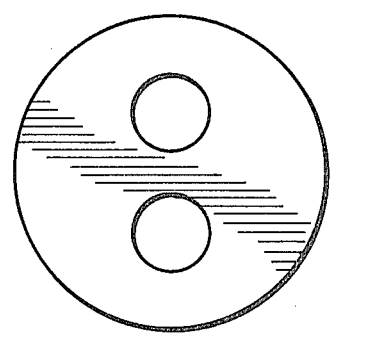
A
FULLY OPEN
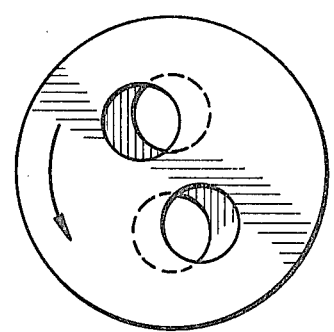
B
THROTTLING
FIG. 2 PRIOR ART
HOLES IN FIXED
DISC ASSEMBLY ----
HOLES IN ROTATING
DISC ASSEMBLY ——
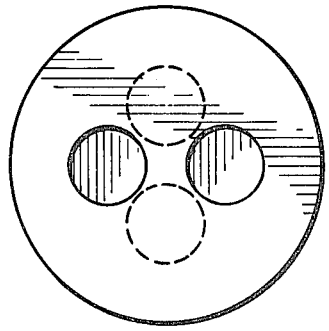
C
FULLY CLOSED

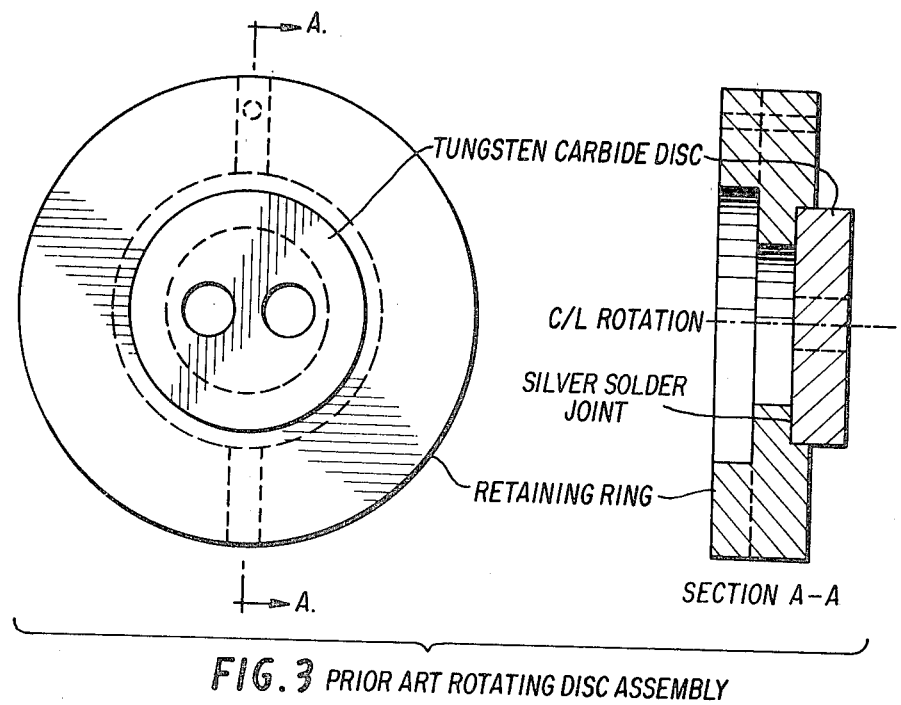
FIG. 3 PRIOR ART ROTATING DISC ASSEMBLY
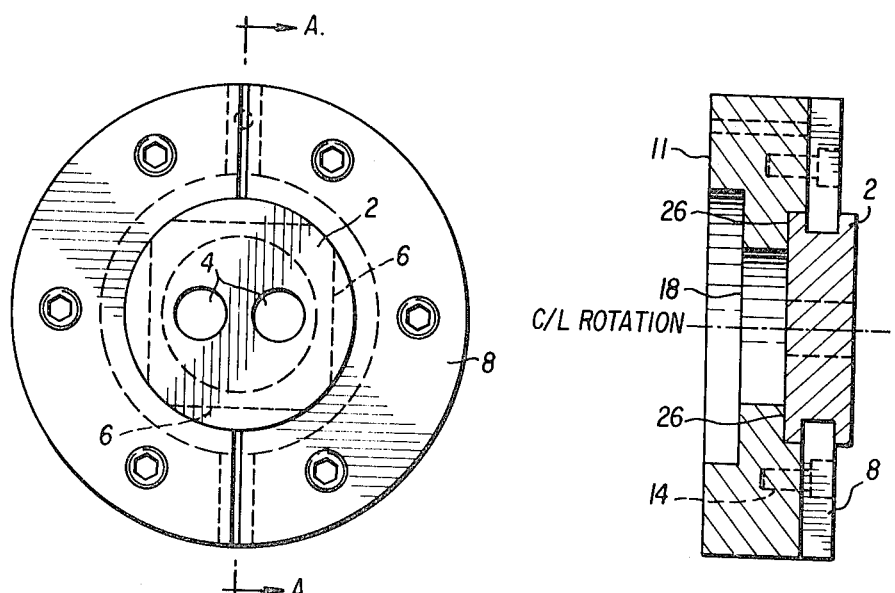
FIG. 4
FIG. 5

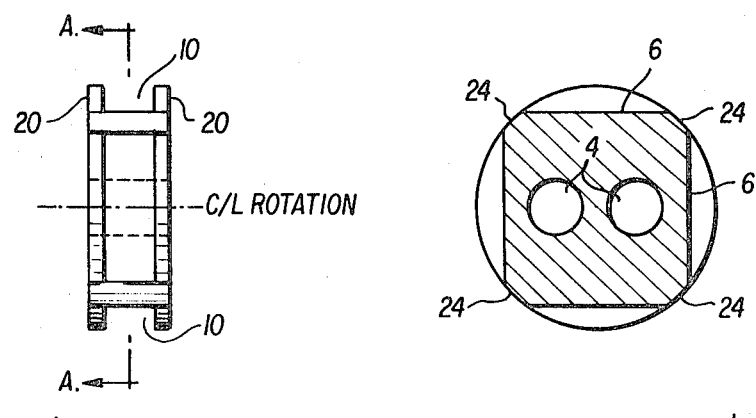
FIG. 6 WEAR RESISTANT INSERT
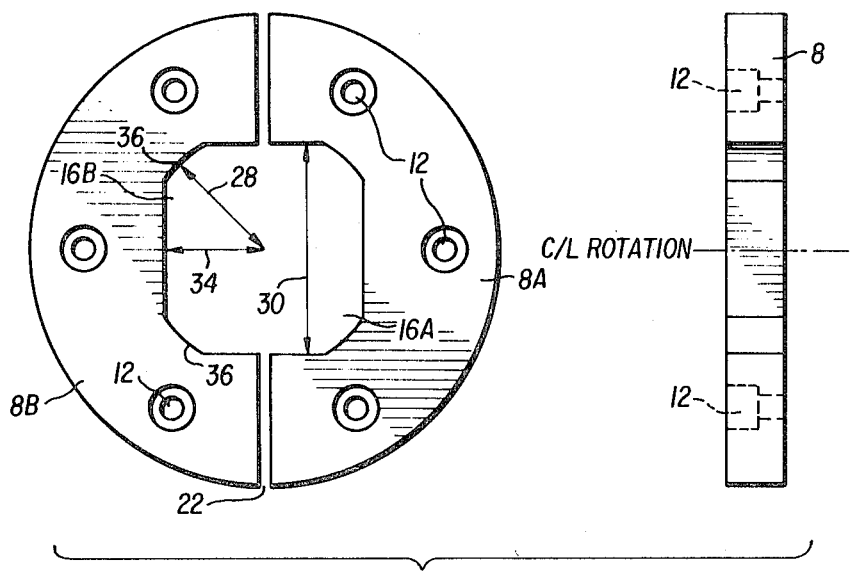
FIG. 7 SPLIT LOCKING RING

SEAL FOR WEAR RESISTANT INSERTS

FIELD OF THE INVENTION

This invention relates to improvements in pressure let-down valves. More particularly, it relates to improvements in means of retaining wear resistant inserts in pressure let-down valves.

BACKGROUND OF THE INVENTION

Many engineering unit operations and processes operate at high pressures, e.g., sometimes exceeding 1000 psig. However, at some point in the process there is a need to decrease the high pressure because of downstream process design or equipment limitations, and/or any combination of these factors. To decrease the pressure from a higher level to a lower level at which downstream equipment and/or unit operations operate, industry commonly uses pressure let-down valves. The pressure let-down valves reduce high pressure fluids out of the particular unit operation to the desired pressure level. Subsequently, the process stream, now at the reduced pressure, is conducted to a down-stream equipment of unit operation. Pressure let-down valves find application in such diverse areas as oil and gas wells, coal liquefaction plants, and synthetic fuels (e.g., methanol-to-gasoline) processes.

One example of a prior art pressure let-down valve is that produced by Willis Oil Tool Company and schematically illustrated in FIGS. 1-3. The Willis pressure let-down valve is available in various sizes, ranging from 1 inch to 8 inches, depending on the desired area of application. A typical Willis pressure let-down valve is comprised of a valve body housing containing a variable choke and, in some cases, a fixed choke. The fixed choke (FIG. 1), when used, is located downstream of the variable choke. The variable choke is comprised of a fixed disc assembly and a rotating disc assembly. The fixed disc assembly and the rotating disc assembly each comprise a substantially circular disc with a number of openings. When the valve is fully opened, the openings in the fixed and in the rotating disc assemblies are in direct alignment with each other (FIG. 2A) to allow the maximum flow of fluids (liquids and/or gases) through the valve. When it is desired to throttle back or decrease the flow rate of fluids through the valve, the variable choke assembly is rotated radially a few degrees from the fully opened position, e.g., by a turning fork (FIG. 1), thereby decreasing the common opening available for the flow of fluids (FIG. 2B). When the desired degree of pressure has been achieved in a process vessel, and it is desired to terminate the flow of fluids therefrom, the turning fork is again turned to cause a complete misalignment of the openings in the rotating and in the fixed disc assemblies (FIG. 2C).

The prior art rotating disc assembly typically comprises a stainless steel retaining ring and a wear-resistant insert having openings therein (FIG. 3). The openings in the wear-resistant insert are aligned with the openings of the fixed disc assembly when a fully opened position of the valve is desired. In prior art, the wear-resistant insert of the rotating disc assembly is attached to the retaining ring by a silver solder joint illustrated in FIG. 3. The retaining ring is usually made of stainless steel and the wear-resistant insert is made from any highly wear-resistant material, such as tungsten carbide. Thus, the silver solder joint has been necessary in heretofore-produced rotating disc assemblies because of dissimilar materials of construction used for the retaining ring and for the wear-resistant inserts. However, in practical applications, the silver solder joint has often failed under process conditions in the first one to six days of operation because of a number of operational factors. For example, different coefficients of expansion of the retaining ring and of the wear-resistant insert, the reduced strength of silver solder at process temperature, and the high sheer stresses imposed on the silver solder joint during throttling operation significantly contribute to the early failure of the silver solder joint. The failure of the joint causes loss of operating control and obvious expensive maintenance costs associated with the need to frequently interrupt the operation of the process to replace or repair the rotating disc assembly.

Accordingly, it is a primary object of the present invention to provide an improved means of attaching a wear-resistant insert to the retaining ring in a pressure let-down valve.

It is an additional object of the present invention to eliminate the silver solder joint between the wear-resistant insert and the retaining ring in a pressure let-down valve, thereby eliminating a major maintenance expense.

Additional objects of this invention will become apparent to those skilled in the art from the study of the specification and of the appended claims.

SUMMARY OF THE INVENTION

In the rotating disc assembly of the present invention, a wear-resistant insert (e.g., a tungsten carbide disc) is attached to the retaining ring by means of a mechanical rather than a metallurgical joint. The mechanical joint comprises a split locking ring and a number of fastening means, e.g., screws, attaching the split locking ring to the existing retaining ring. To accomplish the clamped design, the wear-resistant insert is provided with an annular outwardly-opening channel along the perimeter thereof. The outwardly-opening channel receives an inner edge of the split locking ring. The split locking ring is then attached to the retaining ring by fastening means, such as cap screws fitting into recessed openings on the face of the split locking ring to lock the wear-resistant insert in place. Four flat surfaces are ground on the perimeter of the insert to form the outwardly opening channel. The split locking ring is usually comprised of two separate substantially semicircular segments, each of which has an inside substantially semicircular opening designed to fit into the outwardly-opening channel. The inside diameter of each of the semicircular segments is designed to fit the outside diameter of the wear-resistant insert. Close dimensional tolerances must be maintained between the flat surfaces of the wear-resistant insert and the inside opening of the semicircular segments to compensate for the differential rates of thermal expansion and to provide adequate bearing contact. In addition, the thickness of the segments of the locking ring must be slightly less than the thickness of the outwardly opening channel also to compensate for the variable rates of thermal expansion of the retaining ring and of the wear-resistant insert.

The new mechanical joint between the wear-resistant insert and the retaining ring, aside from eliminating the major structural weakness in the variable rotating disc assembly, also allows an operator of the pressure let-down valves, and any other valves utilizing wear-resistant inserts made of different materials of construction than the structure supporting the wear-resistant inserts, to readily interchange wear-resistant inserts made of distinctly different materials of construction and to use both faces of a particular wear-resistant insert after the useful life of the first face thereof is exhausted.

BRIEF DESCRIPTION OF THE DRAWINGS

FIG. 1 is a cross-section of a conventional prior art pressure let-down valve.

FIG. 2 is a schematic representation of the principle of operation of a conventional prior art pressure let-down valve.

FIG. 3 is a front view and a cross-section A—A of a prior art rotating disc assembly.

FIG. 4 is a front view of the novel rotating disc assembly of the present invention.

FIG. 5 is a cross-section of the novel rotating disc assembly of the present invention taken on plane A—A of FIG. 4.

FIG. 6 is a side view and a cross-section A—A of the wear-resistant insert used in the novel rotating disc assembly of the present invention.

FIG. 7 is a front view and a cross-section of the split locking ring of the present invention.

DETAILED DESCRIPTION OF THE INVENTION

The invention will be described hereinafter with reference to one specific application thereof, i.e., in a pressure let-down valve manufactured by Willis Oil Tool Company. However, it will be apparent to those skilled in the art that the mechanical joint (split-locking ring) of the invention can be readily adapted to any application requiring joining two structural parts made from different materials of construction.

With reference to FIGS. 4–7 illustrating the application of the invention to the Willis pressure let-down valve, the novel rotating disc assembly of the present invention, when used with the Willis valve, comprises a conventional retaining ring 11, a wear-resistant insert 2, and a split locking ring 8, locking the wear-resistant insert into place against the retaining ring. The retaining ring has an indented notch 26 (FIG. 5) for the wear-resistant insert. As shown in FIGS. 4 and 6, the wear-resistant insert has four inside flat surfaces 6 on the perimeter thereof. However, both of the outer faces of the wear-resistant insert retain its circular shape. The wear-resistant insert of the present invention, similarly to the wear-resistant inserts of the prior art, has two openings 4 in the face thereof. The wear-resistant insert also has an annular outwardly-opening channel 10 around the periphery thereof formed by the flat surfaces 6. The channel 10 may be interrupted by four semicircular surfaces 24 (FIG. 6). The channel receives an inner edge of the split locking ring (FIG. 5), which thereby locks the wear-resistant insert into place. It will be apparent to those skilled in the art that the thickness of the split locking ring must be slightly less than the inside dimension of the outwardly opening channel 10 to compensate for different rates of thermal expansion of the wear-resistant insert and of the split locking ring. The split locking ring also has a number of recessed openings 12 on the face thereof (FIG. 7) which receive fastening means, e.g., cap screws 14, which attach the split locking ring to the retaining ring 10 (FIG. 5).

The split locking ring illustrated in FIGS. 4 and 7 is comprised of two semi-circular segments or portions 8A and 8B which fit onto the face of the retaining ring and into the grooves of the outwardly-opening channel 10. Each of the two segments 8A and 8B of the locking ring contains inside openings 16A and 16B, respectively, which, when fastened to the face of the retaining ring, together form a semi-eliptical opening (FIG. 7) for the wear-resistant insert. The semi-eliptical opening formed by the two segments is smaller than the dimensions of the face of the wear-resistant insert, so that the side walls 20 of the outwardly-opening channel 10 overlap the split locking ring. This assures secure attachment of the wear-resistant insert by the split locking ring. Preferably, the dimensions of the segments 16A and 16B are such that, when fastened to the retaining ring, they do not touch each other, but leave a small space 22 for thermal expansion and ease of assembly. Similarly, the dimension of the wear-resistant insert from the center line thereof to any one of the four flat faces 6 must be greater than the opening 18 in the retaining ring (FIG. 5) to securely maintain the wear-resistant insert between the split locking ring and the retaining ring. It will be obvious to those skilled in the art that although the split locking ring means illustrated herein comprises two separate semi-circular portions, such means can also be comprised of more than two portions and they can be of varying shapes and sizes, depending on the shape and size of the retaining ring and of the wear-resistant insert. Any suitable materials of construction can be used for the wear-resistant inserts, e.g., tungsten carbide, silicon carbide, and ceramic. Similarly, the retaining ring means and the split locking ring means can be made of any suitable material, e.g., 17-4 pH stainless steel, or other material suitable for the intended service conditions, but preferably of hardened steel. All sharp corners, e.g., in the wear-resistant insert and in the split locking ring means, are preferably rounded, e.g., surface 24 of the wear-resistant insert (FIG. 6) and the matching rounded surface 36 (FIG. 7) of the split-locking ring. The exact dimensions of the wear-resistant insert and of other parts associated therewith will depend, as will be apparent to those skilled in the art, on the internal diameter of the pressure let-down valve, and the dimensions thereof can be easily adjusted to a particular application.

In one example, the retaining ring 11, made of hardened stainless steel, had an outside diameter of 3.5 inches, inside diameter of 1.250 inches, and thickness of 5/16 inches. The indented notch 26 (FIG. 5) was 1/16 inches deep and 1⅜ inches in diameter. The wear-resistant insert, made of tungsten carbide, had an outside diameter of about 1⅜ inches; it had two openings 4, each ⅜ inches in diameter; each of its four flat channels 10 was 15/16 inches long and about ⅛ inches deep; and its wall 20 was 1/16 inches thick. Each of the split locking ring elements 8A and 8B was ⅜ inches thick; the dimension 28 (FIG. 7) was about 0.83 inches; the dimension 30 was about 1½ inches; the dimension 34 was about 0.7 inches; and it had three openings, each ⅜ inches in diameter and 154 inches deep for the cap screws.

It will be apparent to those skilled in the art that the above examples can be successfully repeated with ingredients equivalent to those generically or specifically set forth above and under variable process conditions.

From the foregoing specification one skilled in the art can readily ascertain the essential features of this invention and without departing from the spirit and scope thereof can adopt it to various diverse applications.

What is claimed is:

1. In a pressure let-down valve comprising a valve body and a variable choke within said body, said variable choke comprising a fixed disc assembly and a rotating disc assembly, said rotating disc assembly comprising a retaining ring and a wear-resistant insert means affixed to said retaining ring,
   an improvement wherein:
      said wear-resistant insert means is attached to said retaining ring by a split locking ring means containing a fastening means in the front surface thereof.

2. A pressure let-down valve of claim 1 wherein said split locking ring means has an opening substantially in the center thereof.

3. A pressure let-down valve of claim 2 wherein said retaining ring and said split locking ring means are substantially circular in shape.

4. A pressure let-down valve of claim 3 wherein said opening in said split locking ring means is substantially circular in shape.

5. A pressure let-down valve of claim 4 wherein said wear-resistant insert means has an annular outwardly opening channel on the perimeter thereof, said channel receiving said split locking ring means.

6. A pressure let-down valve of claim 5 wherein said fastening means is screw means.

7. A pressure let-down valve of claim 6 wherein said wear-resistant insert means is made of tungsten carbide, silicon carbide or ceramic.

8. A pressure let-down valve of claim 7 wherein said split locking ring means comprises two substantially semicircular segments.

9. A pressure let-down valve comprising a valve body and a variable choke within said body, said variable choke comprising a fixed disc assembly and a rotating disc assembly, said rotating disc assembly comprising a retaining ring and a wear-resistant insert means affixed to said retaining ring, an improvement wherein:
   said wear-resistant insert means is attached to said retaining ring by a split-locking ring means,
   said split-locking ring means comprises two substantially semicircular segments, said split locking ring means being fastened to said retaining ring by screw fastening means,
   said retaining ring and said split locking ring means are substantially circular in shape,
   said wear-resistant disc is made of tungsten carbide, silicon carbide or ceramic, and it has an annular outwardly opening channel on the perimeter thereof, said channel receiving said split locking ring means.

10. A pressure let-down valve of claims 1 or 8 wherein said fastening means extends to the front surface of said retaining ring.

11. A pressure let-down valve of claim 8 wherein each of said semicircular segments contains at least one screw means.

12. A pressure let-down valve of claim 10 wherein said screw fastening means is placed in the front surface of said split-locking ring means and its extends to the front surface of said retaining ring.

13. A pressure let-down valve of claim 12 wherein each of said semicircular segments contains at least one screw means.

* * * * *

UNITED STATES PATENT AND TRADEMARK OFFICE
CERTIFICATE OF CORRECTION

PATENT NO. : 4,395,019

DATED : July 26, 1983

INVENTOR(S) : Raymond C. Searles

It is certified that error appears in the above-identified patent and that said Letters Patent is hereby corrected as shown below:

Column 4, line 49, " 1 3/8 inches" should read " 1 3/4"

Column 4, line 51, " 1 3/8 inches" should read " 1 3/4"

Column 4, line 59, "154 inches" should read "3/8 inches"

Signed and Sealed this

Eighteenth Day of October 1983

[SEAL]

Attest:

GERALD J. MOSSINGHOFF

Attesting Officer     Commissioner of Patents and Trademarks